United States Patent [19]

Udagawa

[11] Patent Number: 5,511,796
[45] Date of Patent: Apr. 30, 1996

[54] METAL LAMINATE GASKET WITH SEALING SHIM

[75] Inventor: Tsunekazu Udagawa, Ichikawa, Japan

[73] Assignee: Ishikawa Gasket Co., Ltd., Tokyo, Japan

[21] Appl. No.: 127,577

[22] Filed: Sep. 28, 1993

[30] Foreign Application Priority Data

Oct. 1, 1992 [JP] Japan .................. 4-068732 U

[51] Int. Cl.⁶ .................................... F16J 15/08
[52] U.S. Cl. .................... 277/180; 277/235 B
[58] Field of Search ................... 277/180, 233, 277/235 B

[56] References Cited

U.S. PATENT DOCUMENTS

| | | | |
|---|---|---|---|
| 4,739,999 | 4/1988 | Ishii et al. | 277/235 B |
| 4,776,073 | 10/1988 | Udagawa . | |
| 4,807,892 | 2/1989 | Udagawa | 277/235 B |
| 4,861,046 | 8/1989 | Udagawa . | |
| 5,054,795 | 10/1991 | Udagawa et al. | 277/235 B X |
| 5,082,298 | 1/1992 | Uchida et al. . | |
| 5,092,613 | 3/1992 | Udagawa | 277/235 B |
| 5,120,078 | 6/1992 | Udagawa | 277/180 X |
| 5,201,534 | 4/1993 | Miyaoh | 277/235 B |

FOREIGN PATENT DOCUMENTS

| | | |
|---|---|---|
| 0230804 | 6/1990 | European Pat. Off. . |
| 0468526A1 | 1/1992 | European Pat. Off. . |
| 2220535 | 11/1972 | Germany . |
| 63-82056 | 5/1988 | Japan . |
| 468654 | 1/1992 | Japan ................. 277/235 B |

Primary Examiner—Scott W. Cummings
Attorney, Agent, or Firm—Kanesaka & Takeuchi

[57] ABSTRACT

A metal laminate gasket of the invention is installed in an internal combustion engine having at least one hole to be sealed. The gasket is formed of a plurality of metal plates to form a metal laminate gasket, an auxiliary sealing device formed around a first hole of the gasket for sealing therearound, and an annular shim situated between the metal plates and located outside the auxiliary sealing device. The auxiliary sealing device is compressible, while the shim is non-compressible. When the gasket is tightened, surface pressure greater than that on the auxiliary sealing device is formed on the shim to thereby securely seal around the first hole without causing deformation of the hole of the engine due to high surface pressure around the hole.

7 Claims, 1 Drawing Sheet

METAL LAMINATE GASKET WITH SEALING SHIM

BACKGROUND OF THE INVENTION AND RELATED ART STATEMENT

The present invention relates to a metal laminate gasket with a sealing shim formed around an auxiliary sealing device for a hole to be sealed.

In an internal combustion engine, in order to provide a light engine, a cylinder block as well as a cylinder head may be made of an aluminum alloy. In this case, if high surface pressure is applied through a gasket to seal around a cylinder bore at a portion immediately outside the cylinder bore, the cylinder bore may deform by the high surface pressure.

Even if a cylinder liner is installed in the cylinder block to define the cylinder bore, in case a high surface pressure is applied to the cylinder liner to seal around the cylinder bore, the cylinder liner may deform.

In Japanese Utility Model Publication No. 63-82056, a gasket includes a first sealing portion around a cylinder bore, which is formed by turning a plate around the cylinder bore, and a bead outside the first sealing portion to resiliently seal therearound. In this case, a high surface pressure is formed immediately outside the cylinder bore to securely seal around the cylinder bore, and the bead secondarily seals around the cylinder bore. Thus, the cylinder bore or the cylinder liner may deform.

In order to solve the above problem, U.S. Pat. No. 4,739,999 has been proposed to provide auxiliary and main sealing devices around a hole to be sealed. The auxiliary sealing device located close to the hole to be sealed provides sealing pressure less than that of the main sealing device to thereby prevent deformation of the cylinder liner.

The above U.S. patent operates as intended. However, the gasket of the above patent resiliently seals around the cylinder bore. In case resiliency is not required, or the cylinder head does not have strong rigidity, the gasket as disclosed in the above U.S. patent is not used.

In U.S. Pat. No. 4,776,073 and EP 0,230,804, it is disclosed that a spacer or a shim is formed around a hole to be sealed to provide high surface pressure around the hole. However, the space or shim is not used to provide high surface pressure outside a main sealing device and to control the surface pressure.

Accordingly, one object of the invention is to provide a metal laminate gasket, wherein deformation of a cylinder block around a cylinder bore or a cylinder liner is prevented.

Another object of the invention is to provide a metal laminate gasket as stated above, wherein the cylinder bore can be securely sealed therearound.

A further object of the invention is to provide a metal laminate gasket as stated above, wherein surface pressure around the cylinder bore can be easily controlled.

A still further object of the invention is to provide a metal laminate gasket as stated above, wherein the gasket can be easily and economically manufactured.

Further objects and advantages of the invention will be apparent from the following description of the invention.

SUMMARY OF THE INVENTION

In the present invention, a metal laminate gasket is designed to be installed in an internal combustion engine having at least one hole to be sealed. The gasket is basically formed of a plurality of metal plates laminating together to form a metal laminate gasket and having a first hole corresponding to the hole of the engine, auxiliary sealing means formed around the first hole, and an annular shim located outside the auxiliary sealing means and situated between the metal plates.

The shim is non-compressible but the auxiliary sealing means is compressible. When the gasket is tightened, surface pressure greater than that on the auxiliary sealing means is formed on the shim to thereby securely seal around the first hole without causing deformation of the hole of the engine due to high surface pressure around the hole.

In the invention, the auxiliary sealing means resiliently seals immediately outside the cylinder bore, and the shim non-resiliently seals outside the auxiliary sealing means. When the gasket is tightened, the surface pressure on the shim is greater than that on the auxiliary sealing means. Since the high surface pressure is not formed immediately outside the cylinder bore, deformation of the cylinder bore or cylinder liner is prevented. Also, the surface pressure on the auxiliary sealing means and the shim can be controlled by changing the thickness of the shim.

In case a cylinder liner is installed in a cylinder block, the auxiliary sealing means is located on the cylinder liner, while the shim is located on the cylinder block. Thus, high surface pressure is properly formed on the cylinder block.

The auxiliary sealing means includes a curved portion to define a hole of the engine and a flange located outside the hole. The annular shim is located outside the flange without overlapping thereto.

In case a plurality of cylinder bores is arranged adjacent to each other, the shims situated adjacent to each other may be connected together to form one integral unit. Also, the shims connected to each other may have a communicating or empty portion disposed at a portion between the two adjacent cylinder bores. In this case, although the shims do not completely surround the respective cylinder bores, since the shims surround all the cylinder bores, even if gas leaks at the communicating portion, the leaked gas can be securely sealed at the shim.

DETAILED DESCRIPTION OF PREFERRED EMBODIMENTS

Figure 1:
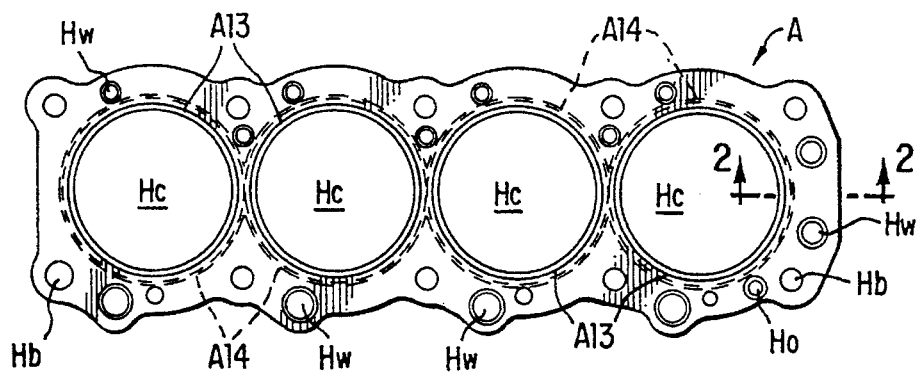
FIG. 1 is a plan view of a first embodiment of a metal laminate gasket of the invention.
Figure 2:
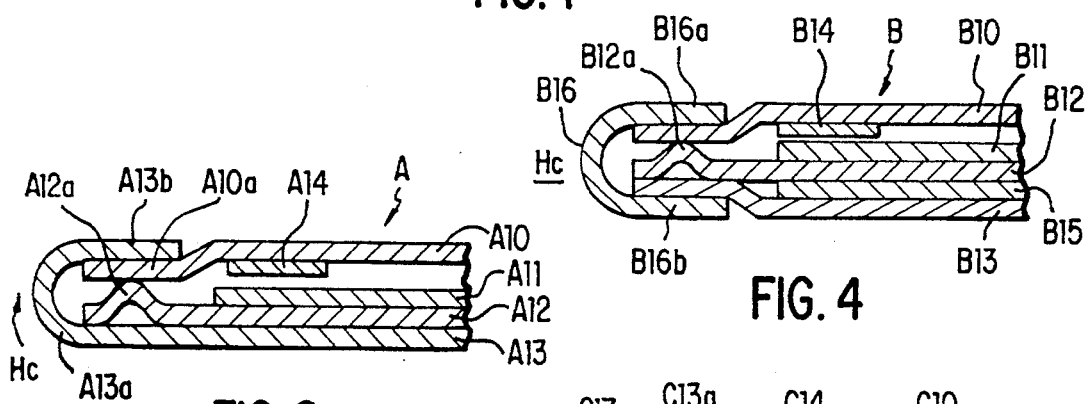
FIG. 2 is an enlarged section view taken along a line 2—2 in FIG. 1.
Figure 3:
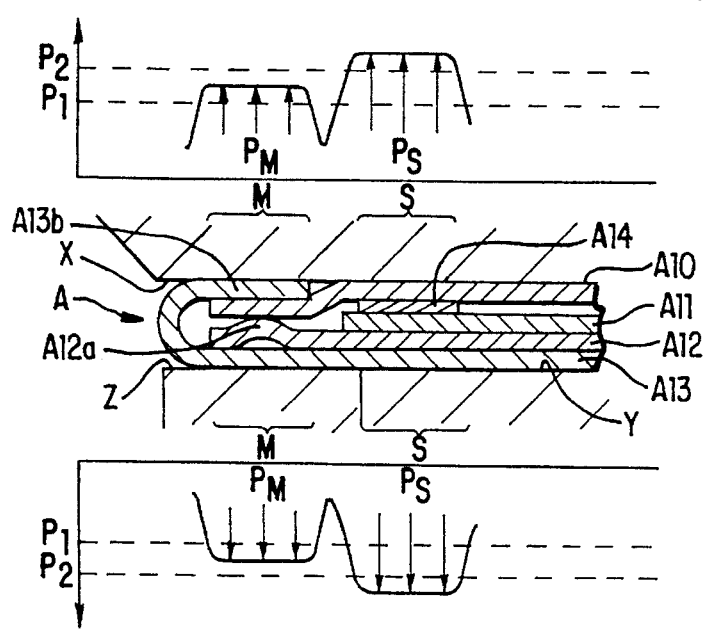
FIG. 3 is an explanatory section view when the gasket in FIG. 2 is compressed.

With reference to FIGS. 1–3, a first embodiment A of a metal laminate gasket of the invention is shown. The gasket A is a cylinder head gasket and includes a plurality of cylinder bores Hc, water holes Hw, oil holes Ho, bolt holes Hb, and so on, as in the conventional gasket.

In the gasket A, portions around the cylinder bores Hc are sealed in accordance with the present invention. Portions around the water holes Hw and oil holes Ho may be sealed in any sealing means.

As shown in FIG. 2, the gasket A is formed of an upper plate A10, two middle plates A11, A12, and a lower plate A13. The plates A10–A13 extend substantially throughout the entire area of the engine to be sealed.

The upper plate A10 includes an inner edge A10a. The middle plate A11 is located under the upper plate A10 outside the inner edge A10a. The middle plate A12 includes a bead A12a situated under the inner edge A10a. The lower plate A13 includes a curved portion A13a to define the cylinder bore Hc, and a flange A13b located above the inner edge A10a.

In the gasket A, an annular shim A14 is installed between the upper plate A10 and the middle plate A11. Namely, the shim A14 is located outside the bead A12a and the flange A13b without laminating thereto. The shim A14 provides high surface pressure around the cylinder bores Hc.

In the gasket A, a portion M where the flange A13b and the bead A12a are located constitutes auxiliary sealing means, while a portion S where the shim A14 is located constitutes main sealing means.

As shown in FIG. 3, when the gasket A is installed between a cylinder head X and a cylinder block Y with a cylinder liner Z, the portion M is located above the cylinder liner Z, and the portion S is located above the cylinder block Y.

When the gasket A is tightened, at first, the bead A12a is compressed. When the surface pressure PM at the portion M comes to a point P1 by the bead A12a, the portion S on the shim A14 begins to be compressed. The gasket A is further compressed until the surface pressure PS at the portion S reaches slightly above a point P2, at which the surface pressure PM is between P1 and P2, and the bead A12a is not completely flattened.

Thus, when the gasket A is compressed, the shim A14 or main sealing means provides high surface pressure outside the bead A12a or auxiliary sealing means. Since high surface pressure is not formed on the cylinder liner Z, the cylinder liner Z does not deform. The gasket A can securely seal between the cylinder head X and the cylinder block Y.

In the gasket A, since the distances between the cylinder bores Hc are not large, the annular shims A14 for the respective cylinder bores Hc are connected together and are not placed at portions between the cylinder bores Hc. Thus, the shims A14 constitute one curved continuous member located outside the respective flanges A13b and the beads A12a.

Although the shims A14 are connected together, the auxiliary sealing means, i.e. the flanges A13b and beads A12a, seals properly around the respective cylinder bores Hc. Thus, combustion gas does not leak from the cylinder bores Hc. However, even if the gas leaks, the shims A14 or the main sealing means provide high surface pressure outside the cylinder bores Hc. Thus, the cylinder bores Hc are substantially completely sealed.

In case the engine has enough distance between the cylinder bores Hc, the shims A14 may completely surround the respective cylinder bores Hc. Also, the adjacent shims may be connected together.

Figure 4:
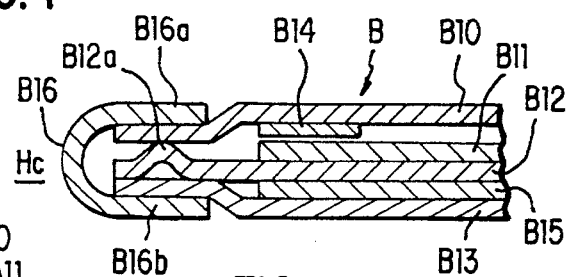
FIGS. 4 and 5 are section views, similar to FIG. 2, of second and third embodiments of the metal laminate gasket of the invention.

FIG. 4 shows a second embodiment B of a metal laminate gasket of the invention. The gasket B includes an upper plate B10, a middle plate B11, a middle plate B12 with a bead B12a, a lower plate B13, and a shim B14, similar to the gasket A. In the gasket B, however, a middle plate B15 is further situated between the plates B12, B13, and a grommet B16 with upper and lower flanges B16a, B16b is installed around the cylinder bore Hc. The gasket B operates as in the gasket A.

Figure 5:
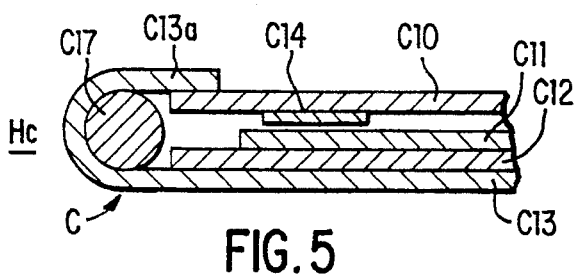

FIG. 5 shows a third embodiment C of a metal laminate gasket of the invention. The gasket C is formed of an upper plate C10, middle plates C11, C12, a lower plate C13 with a flange C13b, and a shim C14, similar to the gasket A. In the gasket C, however, a bead is not formed in the middle plate, but a wire ring C17 is installed around the cylinder bore Hc. The gasket C operates as in the gasket A.

In the present invention, the shim is formed outside the auxiliary sealing means for the cylinder bore Hc to provide high surface pressure outside the auxiliary sealing means. Thus, deformation of the cylinder bore is prevented. Also, the surface pressure around the cylinder bore can be easily adjusted by changing the thickness of the shim.

While the invention has been explained with reference to the specific embodiments of the invention, the explanation is illustrative and the invention is limited only by the appended claims.

What is claimed is:

1. A metal laminate gasket for an internal combustion engine having at least one hole to be sealed, comprising, a plurality of metal plates extending substantially throughout an entire area of the engine and laminating together to form a metal laminate gasket, said gasket having a first hole corresponding to the hole of the engine, auxiliary sealing means formed around the first hole for sealing therearound, said auxiliary sealing means being compressible when the gasket is tightened and including a curved portion situated inside the first hole and a flange located on an outer metal plate in said metal plates for forming the metal laminate gasket, and an annular shim situated between the metal plates and located outside the auxiliary sealing means with the flange relative to and at a predetermined distance away from the first hole, said shim surrounding the auxiliary sealing means without overlapping the flange and being non-compressible so that when the gasket is tightened, resilient surface pressure is formed on the auxiliary sealing means immediately outside the hole of the engine while non-resilient surface pressure is formed on the shim outside the auxiliary sealing means away from the first hole, said surface pressure on the shim being greater than that on the auxiliary sealing means to thereby securely seal around the first hole without causing deformation of the hole of the engine due to high surface pressure around the hole.

2. A metal laminate gasket according to claim 1, wherein said gasket includes a plurality of cylinder bores adjacent to each other, and a plurality of said shims for surrounding the cylinder bores.

3. A metal laminate gasket according to claim 2, wherein said shims situated adjacent to each other are connected together to form one integral unit.

4. A metal laminate gasket according to claim 3, wherein said shims connected to each other have a communication portion disposed at a portion between two adjacent cylinder bores.

5. A metal laminate gasket according to claim 1, in combination with an internal combustion engine wherein said engine includes a cylinder head, a cylinder block, and a cylinder liner situated in the cylinder block, said auxiliary sealing means being situated on the cylinder liner and said annular shim being situated on the cylinder block outside the cylinder liner.

6. A metal laminate gasket according to claim 1, in combination with an internal combustion engine wherein said engine includes a cylinder head, and a cylinder block having a plurality of cylinder bores situated adjacent to each other, each of said cylinder bores being surrounded by the auxiliary sealing means and the annular shim of the gasket.

7. A metal laminate gasket according to claim 6, wherein said shims situated adjacent to each other are connected to form one integral unit, and have a communicating portion disposed at a portion between two adjacent cylinder bores so that each cylinder bore is completely surrounded by the auxiliary sealing means, and the shims surround the cylinder bores outside the auxiliary sealing means without surrounding the portion between two adjacent cylinder bores.

* * * * *